Oct. 27, 1936.  H. BECHER ET AL  2,058,552
DIPPING FORM FOR MAKING DIPPED RUBBER ARTICLES
Filed Jan. 23, 1936
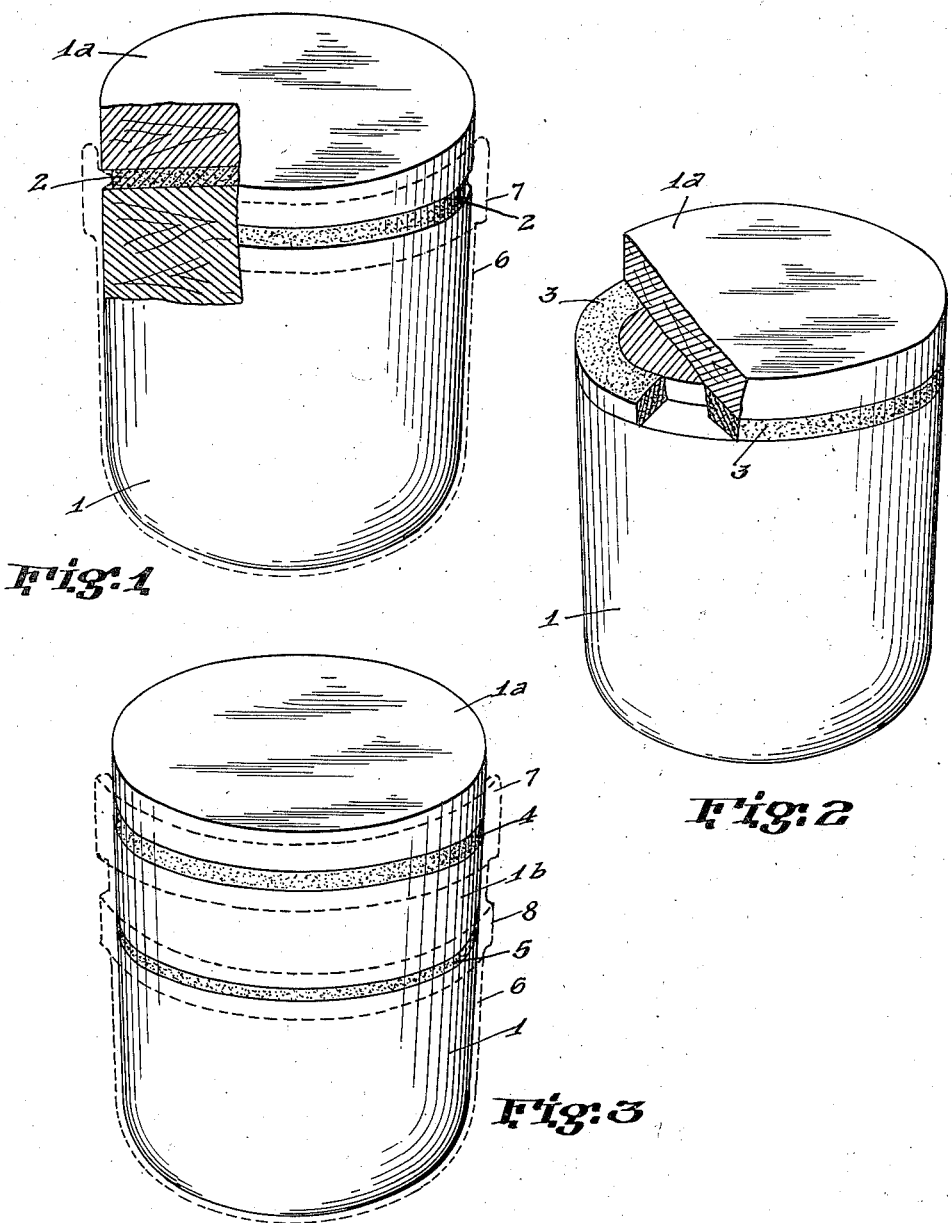
INVENTORS
Harold Becher
Jacob Stein
BY
Mock & Blum
ATTORNEYS

UNITED STATES PATENT OFFICE 2,058,552

DIPPING FORM FOR MAKING DIPPED RUBBER ARTICLES

Harold Becher and Jacob Stein, New York, N. Y.; said Becher assignor to said Stein Application January 23, 1936, Serial No. 60,412

5 Claims. (Cl. 18—41)

Our invention relates to a new and improved dipping form for making dipped rubber articles.

One of the objects of our invention is to provide an improved form for making rubber articles from latex and other dispersions or solutions of rubber, by means of the dipping process.

Another object of our invention is to provide an improved form for making a dipped article made of rubber, so as to produce a rubber article whose wall is of varying thickness.

Another object of our invention is to provide a form for said purpose, whereby the article will be provided with a heavy and reinforcing edge, which will be thicker than the wall of the body of the article.

The invention applies to the manufacture of rubber gloves, rubber finger cots, and to numerous other articles which are made and which can be made by the dipping process.

Other objects of our invention will be set forth in the following description and drawing which illustrates a preferred embodiment thereof, it being understood that the above statement of the objects of our invention is intended generally to explain the same without limiting it in any manner.

Fig. 1 is a perspective view partially in section, which diagrammatically shows one embodiment of the improved form.

Fig. 2 is a view similar to Fig. 1, showing a second embodiment.

Fig. 3 is a perspective view of a third embodiment.

It has heretofore been well known to make rubber articles by the dipping process, with the use of forms made of porcelain, wood or other materials. Said forms had smooth outer surfaces, which were substantially non-porous.

It has also been proposed to use plaster of Paris for making an entire form. Such forms are dipped into latex or other dispersions or solutions of rubber until a film of the rubber is deposited upon the form. This film may be allowed to dry and the thickness of the wall of the rubber object can be built up, if desired, by means of successive dippings.

We have found that it is possible to produce a rubber object having a rubber wall of varying thickness, by using an insert which is made of plaster of Paris, in a form which is made of wood or porcelain or like material.

As shown in the annexed drawing, the body 1 of the form is made of wood or porcelain or any other suitable material. Said form has a top surface 1a.

In the embodiment shown in Fig. 1, the wall of the form 1 is provided with a helical groove, in which the plaster of Paris member 2 is located. The wall of the form 1 can be provided with a groove, and the plaster of Paris in the wet and plastic form, can be placed within said groove, and the plaster of Paris material can then be allowed to set or harden. Said helical groove can be of any desired height, and it may have any number of turns. In this particular embodiment, the outer surface of the plaster of Paris member 2 is located within the surface of the main body of said mould.

When a mould of this type is used for dipping, this results in the formation of a rubber object having a relatively thin wall 6, and having a thickened edge-portion 7, which is shown diagrammatically in Fig. 1. It is to be noted that the shape which is diagrammatically illustrated in Fig. 1, is not necessarily the exact shape of the rubber object which is secured by means of said form.

In the embodiment shown in Fig. 1, a single and annular plaster of Paris member 3 is formed in a suitable annular recess or groove of the mould 1.

In the embodiment shown in Fig. 3, two plaster of Paris inserts 4 and 5 are provided, and the height of the insert 4 exceeds the height of the insert 5.

The use of the mould shown in Fig. 1 produces two thickened wall-portions 7 and 8.

The wall-portion 1b of the mould can be of any desired height.

When this form is utilized for dipping, experience has shown that a thicker deposit of the latex or other rubber material is formed at the outer wall of the plaster of Paris insert, than at the part of the mould which is made of wood, or porcelain, or other material which has less porosity than said plaster of Paris. The plaster of Paris exercises a differential surface effect, which may be either a surface-tension effect or an adhesion effect, or a capillary effect.

It is thus possible to use the composite form by means of a single dipping or by means of repeated dippings, thus forming a rubber object whose wall is thicker adjacent the plaster of Paris material, than at the wood, porcelain or corresponding and relatively non-porous material.

The latex may be permitted to dry between successive dippings, although the best effect is secured by means of a single dipping.

In order to allow the plaster of Paris insert to exert this differential effect, it is desirable that the time of dipping shall be at least 5 to 10 seconds, if it is desired to form a rubber object having a wall whose thickness is 0.005 inch at the wood, porcelain or the like, said rubber object having a wall whose thickness is .007–.015 inch at the plaster of Paris material.

Whenever we refer to latex or rubber or the like, we wish to include synthetic rubbers and we also wish to include rubber or rubber-like substances (natural or synthetic) to which compounding ingredients of any suitable type may be added. Said ingredients may include vulcanization accelerators and the like.

These thin rubber objects are ordinarily vulcanized by means of the cold cure with sulphur chloride or the like, so that it is not necessary to add any sulphur or any other vulcanization ingredient to the dispersion and we prefer to use this type of dispersion. However, it would not be departing from our invention if sulphur or other vulcanizing material was a part of the solution or dispersion into which the form is dipped, and we can use heat curing.

We do not wish to be limited to the use of a member or insert which is made of plaster of Paris. We can use other materials which become plastic when mixed with water, and which set or harden. For example, the insert can be made from a mortar which can be made by mixing slaked lime and water and filling material such as sand.

Likewise, we can use the so-called hydraulic cements.

For example, said insert or inserts can be made of Portland cement.

Likewise, we can use the magnesium oxy-chloride cement, which can be made by mixing 25 grams of calcined powdered magnesite with 10 cc. of magnesium chloride solution (24° Bé.).

Likewise, the desired capillary action can be secured by making the mould of wood or porcelain or metal or other relatively non-porous material, and roughening the surface of the mould at the desired area or areas, or by providing said desired areas or area with fine grooves.

We have given a number of examples of our invention, in order to avoid being limited to any particular form thereof, but it is obvious that other additions and changes will occur to a person skilled in the art, and we do not wish to be limited to the examples or to the details heretofore specified.

The form shown in Fig. 1, or in any other figure, can be dipped into the latex while the form is held inverted or in any position. After the form has been dipped and the form is removed, some of the latex runs off the form. The porosity or roughness of the plaster of Paris (or equivalent material or structure) lessens the tendency of the latex to run off this particular part of the form, so that the liquid latex accumulates at the groove, thus providing a mark of separation for the removal of the trimming edge. The parts of the form may be made in any desired number of pieces, which can be fastened to each other.

The plaster of Paris member or members may project beyond the remaining surface of the mold, and said member or members may be arranged in any pattern or have any desired design or designs impressed or otherwise formed therein.

We have shown a preferred embodiment of our invention, but it is clear that numerous changes and omissions can be made without departing from its spirit.

We claim:—

1. A dipping form for use in making dipped rubber articles, said form having a composite wall the rubber dispersion having greater adhesion to one portion of said wall than to another portion thereof, whereby a rubber article can be formed whose wall is of different thickness.

2. A dipping form for making a dipped rubber article having a lip portion which is thicker than the body portion of said rubber article, said form having a composite wall, the rubber dispersion having greater adhesion to that portion of the wall of said form at which the lip of the rubber article is to be formed, than at the adjacent portion of said form.

3. A dipping form for making dipped rubber articles, said form having a composite wall, a portion of said wall being made of plaster of Paris.

4. A dipping form for making dipped rubber articles, said form having a composite wall, a portion of said wall being made of plaster of Paris, the remainder of said wall being less porous than the plaster of Paris.

5. An improved dipping form for making dipped rubber articles, said form having a composite wall, only a portion of said wall being composed of a set-hydraulic cement, the remainder of said wall being made of material to which the rubber dispersion has lower adhesive properties than to said hydraulic cement.

HAROLD BECHER.
JACOB STEIN.